United States Patent
Maruyama et al.

[11] Patent Number: 5,088,297
[45] Date of Patent: Feb. 18, 1992

[54] AIR CONDITIONING APPARATUS

[75] Inventors: Hiroshi Maruyama; Takashi Kato; Masaya Taniguchi, all of Shimizu, Japan

[73] Assignee: Hitachi, Ltd., Tokyo, Japan

[21] Appl. No.: 587,740

[22] Filed: Sep. 25, 1990

[30] Foreign Application Priority Data

Sep. 27, 1989 [JP] Japan .................. 1-249145
May 24, 1990 [JP] Japan .................. 2-134314

[51] Int. Cl.$^5$ .......................... F25B 1/00; H02P 1/00
[52] U.S. Cl. ...................... 62/228.4; 417/45; 318/811
[58] Field of Search ............. 62/228.4, 227; 417/45; 318/811

[56] References Cited

U.S. PATENT DOCUMENTS 4,636,928  1/1987  Deguchi et al. ............ 318/811 X
4,905,135  2/1990  Unehara et al. ............ 318/811 X Primary Examiner—William E. Wayner
Attorney, Agent, or Firm—Antonelli, Terry, Stout & Kraus

[57] ABSTRACT

An air conditioning apparatus using a refrigerating cycle in which a scroll compressor is used to compress a refrigerant. The scroll compressor is driven by an induction motor. The speed of the induction motor is controlled by a PWM type inverter which produces an AC voltage of variable frequency. A carrier frequency higher than 10 KHz is used to effect pulse width modulation of the AC voltage of the inverter, whereby generation of uncomfortable noise is avoided. A control unit is provided to detect slip of the induction motor and to adjust the detached slip to a predetermined optimum value, thereby avoiding excessive lowering of the speed of the motor which may cause lack of lubricating oil for the compressor.

2 Claims, 4 Drawing Sheets

AIR CONDITIONING APPARATUS

BACKGROUND OF THE INVENTION

1. Field of the Invention

The present invention relates to an air conditioning apparatus for use as a room cooler, a room heater, or a room cooler and heater in which use is made of a scroll compressor to compress a refrigerant and, more particularly, an air conditioning apparatus of this kind in which the scroll compressor is operated under the control of an inverter which is driven at a high carrier frequency to control the capacity of the scroll compressor.

2. Description of the Related Art

In an air conditioning apparatus of the type in which an electric motor for driving a refrigerant compressor is operated under the control of an inverter of variable operating frequency, it has been usual to control the capacity of the compressor by varying the operating frequency of the inverter to change the speed of the electric motor, depending upon the capacity required for the air conditioning apparatus. The inverter is arranged to convert a DC current (usually produced from a commercial AC line by using rectifying and smoothing means) into an AC current (in general, a three-phase AC current) of an operating frequency, by means of a power switching element which is turned ON and OFF at a frequency corresponding to the operating frequency, and to feed the converted AC current to the electric motor. In order to increase the speed of the electric motor correspondingly to the increase of the operating frequency under the same torque, it is necessary to increase the output voltage of the inverter in accordance with the increase in the operating frequency. For this purpose, a system may be used in which the output of the inverter is varied by varying the DC voltage from which the AC voltage is converted, but an inverter of a voltage PWM (pulse width modulation) type has been frequently used which is arranged to hold the DC voltage at a constant value and to chop the output AC voltage by a frequency which is considerably higher than the operating frequency so as to increase ON-duty ratio, that is, to increase the time-averaged output voltage with the increase in the operating frequency. The pulse width modulation is effected by comparing the given time-averaged output voltage with the carrier voltage of high frequency and turning ON and OFF the switching element at a required ON-duty ratio at said carrier frequency on the basis of such comparison.

In the conventional air conditioning apparatus using the inverter of the voltage PW type, the operating frequency of the inverter for driving the compressor has been 30 Hz to 90 Hz or 30 Hz to 115 Hz, while the carrier frequency of the inverter has been 1 KHz to 2 KHz As an example of the apparatus of this kind, U.S. Pat. No. 4,736,595 may be referred to.

In the prior art as described above, the carrier frequency of the inverter for driving the motor is relatively low, such as 1-2 KHz, and consequently, an electromagnetic audible noise is generated from the motor owing to said carrier frequency and particularly in the case where the motor is operated at low frequency such electromagnetic noise forms an uncomfortable noise which may adversely affect the ambient comfort.

Furthermore, in the case where the motor is operating at a low frequency, the pressure for feeding oil in the compressor is decreased owing to slowing of the speed of the compressor, with the result that the oil fed to bearing parts of the compressor decreases, thereby causing wearing of the shaft of the compressor. In order to avoid such defect it is impossible to decrease the minimum operating frequency below the above-mentioned limit.

OBJECT OF THE INVENTION

It is a general object of the present invention to solve the above-described problems involved in conventional air conditioning apparatus.

It is a particular object of the present invention to provide an air conditioning apparatus which serves to reduce generation of an uncomfortable noise during operation, to avoid excessive lowering of speed of the compressor even at a low operating frequency, and to enable decreasing of the minimum operating frequency.

SUMMARY OF THE INVENTION

In accordance with an aspect of the present invention, there is provided an air conditioning apparatus including a refrigerating cycle in which a scroll compressor is used for compressing refrigerant, comprising: an induction motor for driving the scroll compressor, and an inverter for feeding an AC voltage to the induction motor, the inverter being a voltage PWM type to feed AC voltage of variable operating frequency which is pulse-width modulated by a high carrier frequency higher than 10 KHz.

In accordance with another aspect of the present invention there is provided an air conditioning apparatus of the above kind in which the inverter includes control means for detecting the slip of the induction motor and for correcting the slip thus detected to a predetermined optimum value.

In accordance with a further aspect of the present invention there is provided an air conditioning apparatus of the above kind in which the control means is arranged to effect correction of the slip when the operating frequency of the inverter is at or near the minimum operating frequency.

According to the invention as described above, the scroll compressor is used as the compressor for compressing the refrigerant of the air conditioning apparatus, the carrier frequency for the inverter of the voltage PWM type having variable operating frequency for driving the induction motor of the compressor is held at a value higher than 10 KHz and the control means is used to control the slip of the induction motor to an optimum value, thereby operating the apparatus in stable condition.

Thus, the uncomfortable electro-magnetic noise generated by the motor can be reduced and the actual speed of the motor is stabilized even at a low frequency range, whereby the noise during operation can be reduced and the operable range of the apparatus can be increased.

DESCRIPTION OF THE PREFERRED EMBODIMENT

Now, the preferred embodiment of the present invention will be explained, with reference to the accompanying drawings.

Figure 1:
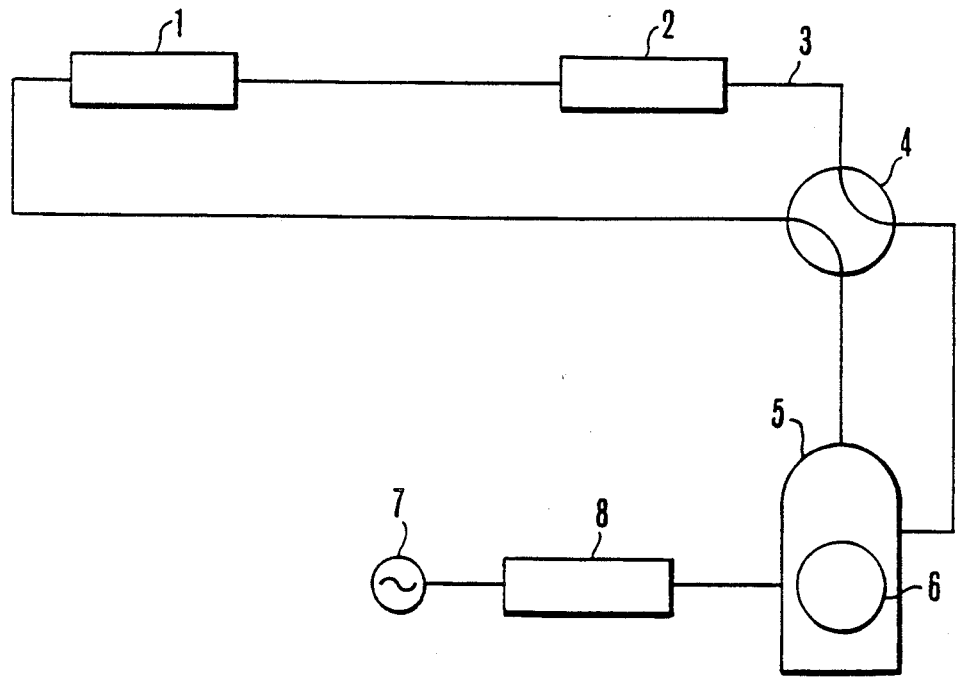
FIG. 1 is a block diagram illustrating a preferred embodiment of the air conditioning apparatus according to the present invention.

Referring to FIG. 1, the air conditioning apparatus according to the present invention includes an indoor heat exchanger unit 1, an outdoor heat exchanger unit 2 and a refrigerant conduit 3 which is connected with the indoor heat exchanger unit 1 and the outdoor heat exchanger unit 2, thereby constituting a refrigerating cycle. A four-way valve 4 is disposed in the refrigerating cycle constituting conduit to change over the flow direction of the refrigerant in the refrigerating cycle depending on the room cooling mode or heating mode. A scroll compressor 5 has an induction motor 6 contained therein and includes a mechanism for effecting suction, compression and discharge of the refrigerant under the action of the induction motor 6. A power supply source 7 is provided to feed power to the air conditioning apparatus. An inverter 8 is arranged to control the speed of the induction motor 6 contained in the scroll compressor 5 by using the power supplied from the power supply source.

Figure 6:
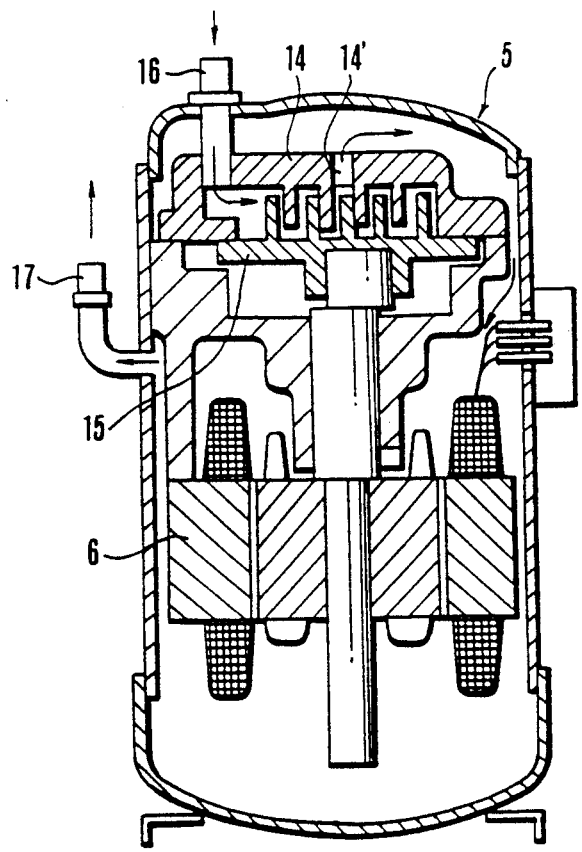
FIG. 6 is a sectional view of the scroll compressor.

The scroll compressor 5 has a construction as shown in sectional view in FIG. 6, for example. In this scroll compressor, as the induction motor 6 is rotated, a gas at a low pressure is sucked through an inlet port 16 which is positioned outside of a fixed scroll 14 and confined in a compressing space formed between the fixed scroll 14 and an orbiting scroll 15 having spiral wraps. The gas confined in the compressing space is successively compressed toward the center of the spiral wrap of the scroll under the action of the orbiting motion of the orbiting scroll 15 which is driven by the induction motor 6 through a crankshaft connected with the induction motor 6. The compressing space is of a minimum volume at the center, so that the gas is compressed to maximum extent a the center and it is discharged through a discharging port 14' at the center of the fixed scroll 14 into an upper discharging chamber. Then, the gas passes through a motor chamber and is discharged to the outside of the compressor through a discharging port 17. Thus the refrigerant gas is continuously subjected to repeated action of the suction-compression-discharging, and the discharged refrigerant is fed to the refrigerating cycle, whereby the room cooling or heating operation is performed.

Figure 2:
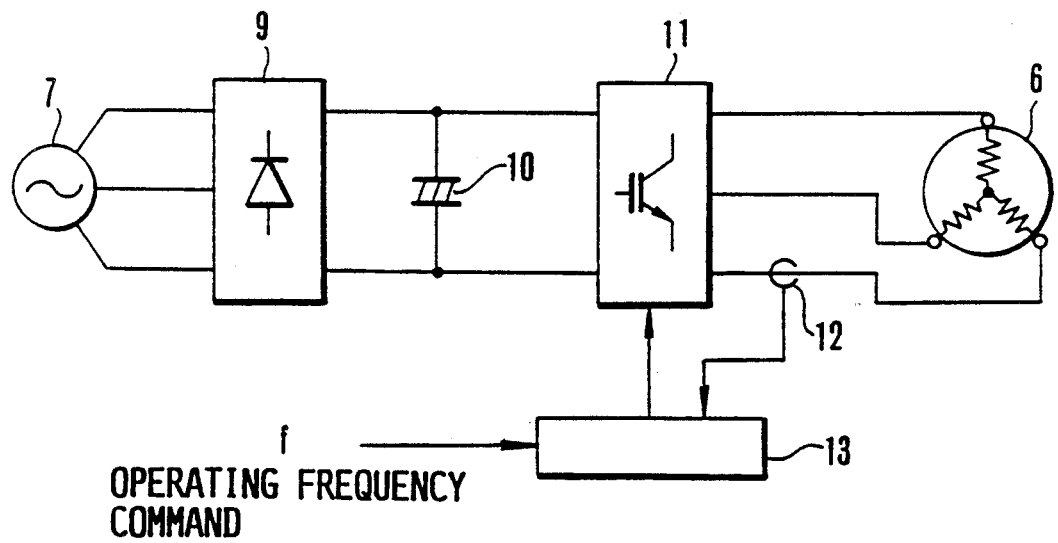
FIG. 2 is a diagram showing an inverter portion of FIG. 1.

As depicted in FIG. 2, the inverter 8 consists of a rectifier element 9 for converting AC current fed from the power supply source 7 into DC current, a smoothing capacitor 10, a switching element 11 for converting the DC current into an AC current, a current sensor 12 for detecting current which passes to the induction motor, and a control unit 13 which receives current from the current sensor 12 and drives the switching element 11.

According to the construction as described above, the AC current fed from the power supply source 7 is converted into DC current under the action of the rectifier element 9 and then it is smoothed under the action of the smoothing capacitor 10 and fed to the switching element 11.

Although not particularly illustrated in the drawings, the operating state of the indoor unit of the air conditioning apparatus is detected and the operating state thus detected is transmitted to the outdoor unit. In the outdoor unit, the operating state transmitted from the indoor unit and the operating state of the outdoor unit are processed to form a command for operation of the compressor, which is transmitted to the control unit 13.

The control unit 13, which receives the operation command, acts to switch the switching element 11, thereby generating an AC current, having the required operating frequency in accordance with the operation command, and to feed such AC current to the induction motor 6, which is driven thereby. In the illustrated embodiment, the switching element 11 is formed of IGBT's (Insulated gate bipolar transistors). The inverter control unit 13 is arranged to effect PWM (pulse width modulation) which acts to increase the time-averaged value of the output voltage of the inverter fed to the motor 6 as the the operating frequency is increased, so that the motor 6 is rotated at a higher speed as the operating frequency becomes higher. Thus, it is possible to effect capacity control of the scroll compressor 5. In the illustrated embodiment, the chopping frequency used in the PWM, namely the carrier frequency, is higher than 10 KHz, so that the generation of electromagnetic noise within the audible range from the motor is avoided.

The operating frequency of the inverter is lowered to decrease the speed of the motor 6, as the room temperature is lowered to come near a set temperature after starting operation in the room cooling mode, or as the room temperature is raised to come near a set temperature after starting operation in the room heating mode, that is, as the cooling load or the heating load decreases, whereby the motor 6 rotates at the minimum speed under a predetermined minimum cooling load or a predetermined minimum heating load.

Figure 3:
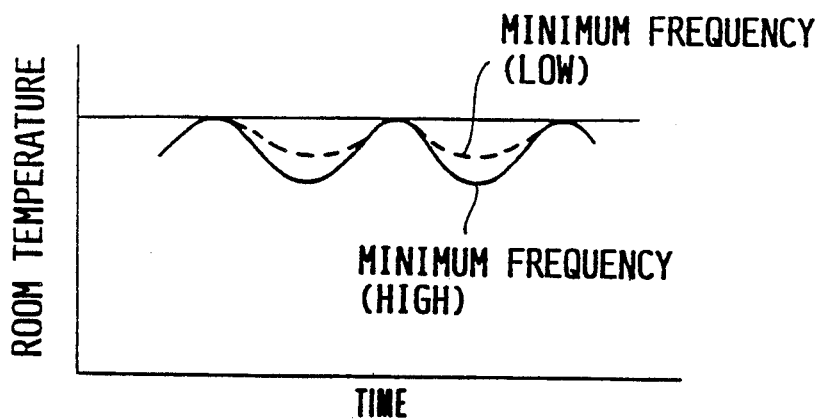
FIG. 3 shows the change of room temperature owing to the difference in the minimum frequency of the air conditioning apparatus.

In the case where a frequency lower than the minimum operating frequency is required, the operation of the compressor is stopped and thereafter it is restarted. Accordingly, in such case, the stopping and the starting of the compressor is repeated, so that hunting of the room temperature may occur. Under the circumstances, it is preferred to set these minimum operating frequencies at a low value, as illustrated in FIG. 3, whereby variation of the room temperature is decreased and thus comfortability is improved.

However, when the minimum operating frequency is lowered, the speed of the compressor is decreased, so that in a scroll compressor of general type having such construction that a bearing part is lubricated under oil pressure by the pumping action produced by the rotation of the compressor, the oil feeding pressure may become excessively decreased until satisfactory lubrication of the bearing part of the compressor cannot be obtained, with the result that wearing of the bearing part may occur. Accordingly, it is impossible to simply decrease the minimum operating frequency.

In the illustrated embodiment, in order to eliminate such disadvantage, the following measure is provided.

Figure 4:
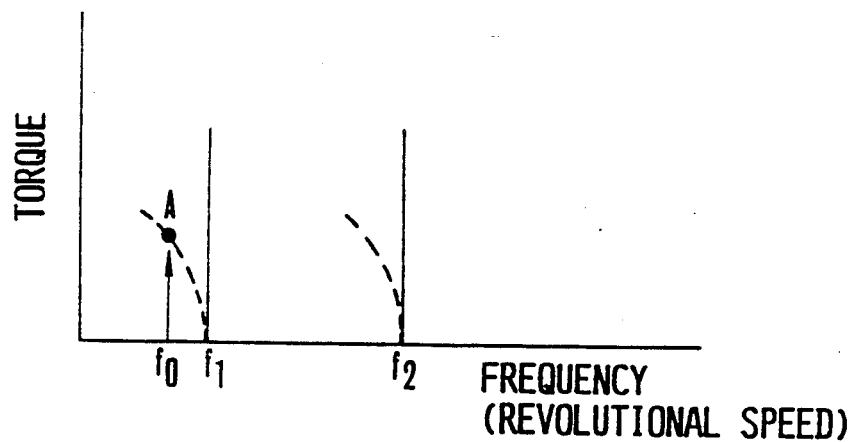
FIG. 4 shows the change in torque of the air conditioning apparatus in accordance with an embodiment of the present invention.

Such measure includes detecting the current passing to the induction motor 6 for driving the compressor 5 by means of the current sensor 12, separating the exciting component of the current of the induction motor 6 for driving the compressor from the detected current, thereby detecting only the torque component, and measuring the slip of the induction motor 6 from the torque component. As the load on the compressor 5, consequently the torque, is increased as shown in FIG. 4, the slip of the induction motor 6 increases, so that the actual speed decreases (the actual speed is indicated by a broken line in FIG. 4) and thus the oil feeding pressure becomes insufficient to lubricate the bearing part, owing to lowering of the actual motor speed in the low frequency range. In order to avoid such disadvantage, the illustrated embodiment is arranged to measure the slip of the induction motor 6, as explained above, and to correct the slip, thereby preventing the actual speed from becoming lower than a predetermined speed for the particular operating frequency. Thus, satisfactory oil feeding can be assured.

Figure 5:
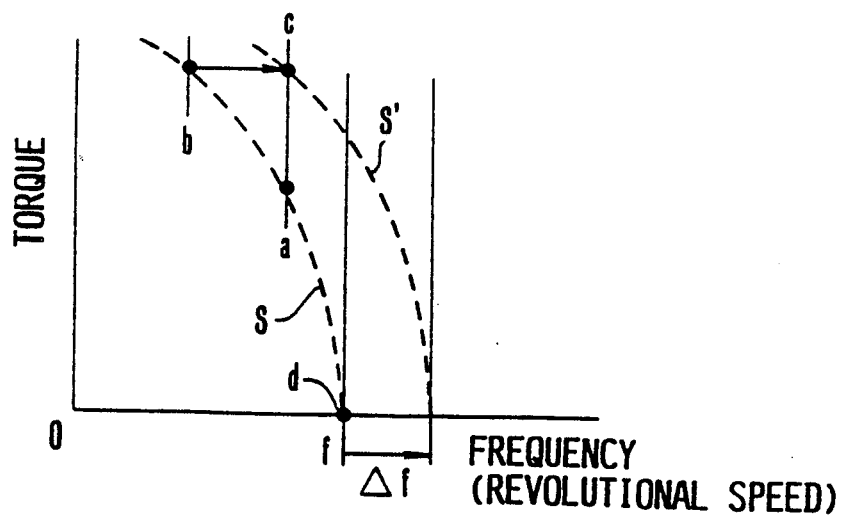
FIG. 5 is an explanatory diagram showing correction of slip in the induction motor in the embodiment of the present invention.

The correction of the slip can be effected in the manner as shown in FIG. 5, for example. Referring to FIG. 5, it is assumed that the operating state of the induction motor 6 at an operating frequency f is located at a point b on the broken line S. A point of intersection d of said broken line S with the abscissa represents a synchronous speed at that frequency f (namely, speed at zero slip). The slip is measured from the detected output of the current sensor 12, as described above, and the control unit 13 acts, on this detected slip, to control the inverter to the frequency corresponding to the frequency f plus a frequency correction component $\Delta f$, so that slip at the same torque is corrected from the point b to a point a corresponding to a predetermined optimum slip on the same broken line S. As the result, the motor 6 is operated at a point c (corresponding to the point a) at the same torque on the operation curve (broken line S') at the corrected frequency. Thus the slip of the induction motor 6 is adjusted to the optimum value.

The correcting control of the slip as described above can be effected at any operating frequency but in practice it is preferable to effect such correcting control only at a low operating frequency (for example, at 60 Hz or lower) or at a frequency near the minimum operating frequency.

According to the prior art, it is assumed that operation is possible at the minimum operating frequency $f_1$ in FIG. 4 at the lowest, and a point A is a limit in view of the load condition at the minimum operating frequency. As compared thereto, according to the illustrated embodiment, it is possible to lower the minimum operating frequency to $f_0$, by effecting the above-described slip correcting control.

Figure 7:
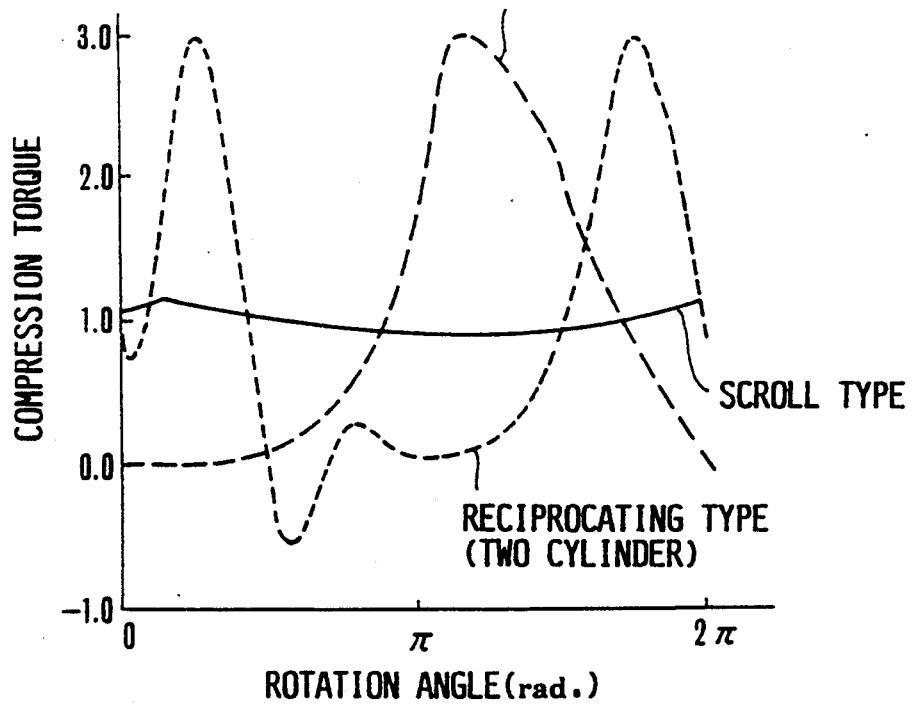
FIG. 7 is a diagram showing torque characteristics of various types of compressors.

Furthermore, in the air conditioning apparatus according to the present invention the scroll compressor is used as the refrigerant compressor. Accordingly, a variation of work, namely, a variation of the compression torque per one revolution of the compressor, is lower than that of the compressor of the other types, as shown in FIG. 7, so that generation of vibration and noise is decreased. Accordingly, the scroll compressor is advantageously used in the low frequency range.

Figure 8:
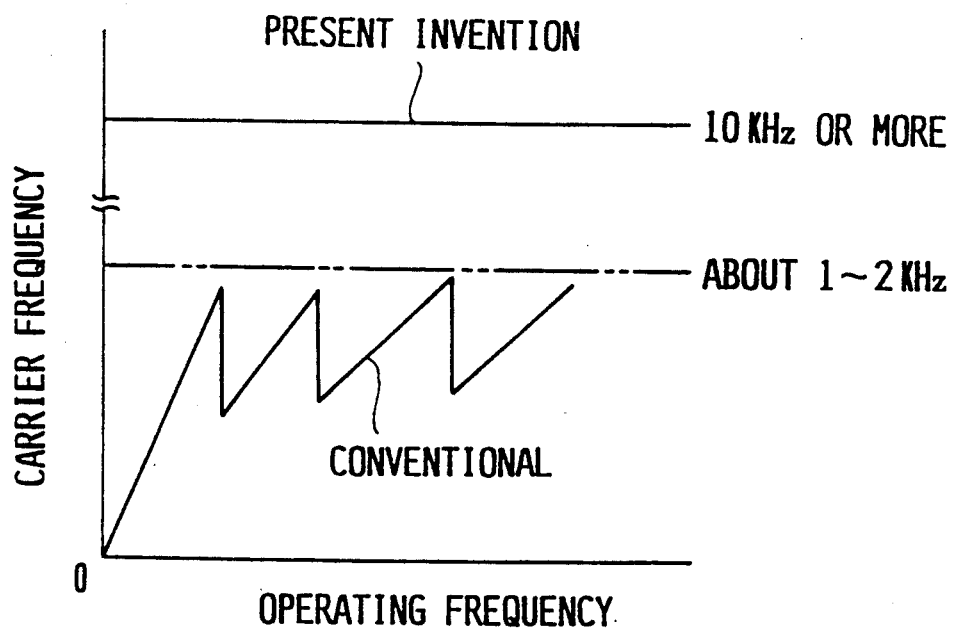
FIG. 8 is a characteristic diagram showing carrier frequencies of the embodiment of the present invention and of the prior art.
Figure 9:
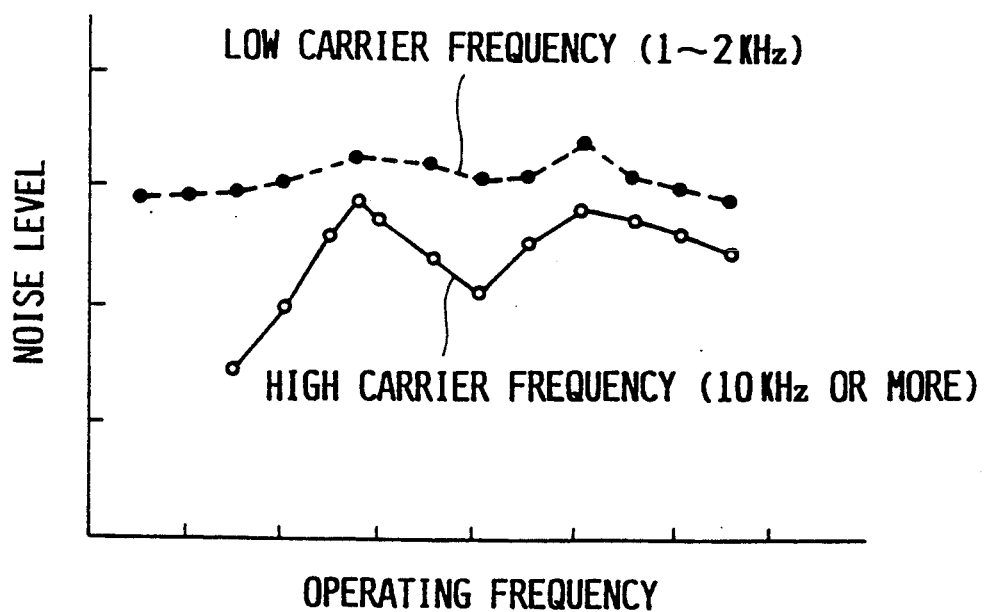
FIG. 9 is a diagram showing noise generated in the apparatus of the present invention and in prior art.

It is further noted from FIGS. 8 and 9 that according to the prior art the switching frequency (carrier frequency) of the switching element for effecting PWM is relatively low, such as 1-2 KHz, so that an electromagnetic noise within an audible range may be produced owing to the switching action of feeding of power to the induction motor 6 and, particularly an uncomfortable noise may be generated during operation at low frequency, while according to the present invention the influence of electromagnetic noise is minimized at a level higher than the audible range, by increasing the carrier frequency beyond 10 KHz, so that the present invention has the advantage that noise is decreased.

Furthermore, when the carrier frequency of the IGBT inverter is increased to a high frequency beyond 10 KHz, the output current of the inverter comes near sinusoidal wave shape, with the result that the efficiency of the motor for driving the scroll compressor can be improved, so that the temperature (heat generation) of the motor winding can be lowered. As the result, the compressing efficiency of the compressor can be improved by using the scroll compressor of a high pressure chamber type in which the motor is positioned in a sealed chamber within a motor casing and the sealed chamber is held at a high pressure under the action of a gas discharged from the compressor.

Thus, it will be understood that the present invention provides an air conditioning apparatus in which the generation of uncomfortable noise can be decreased by increasing the carrier frequency of the voltage PWM type inverter. The air conditioning apparatus according to the present invention can be applied to a low frequency range, owing to using the scroll compressor. Thus, an air conditioning apparatus of low noise type can be by the construction in which the motor for driving a scroll compressor is controlled by a voltage PWM type inverter using a high carrier frequency. That is, the use of the scroll compressor contributes to attaining the decreasing of the noise caused by the compressor. The generation of an uncomfortable audible noise which may result from the inverter is avoided by increasing the carrier frequency, and an air conditioning apparatus of low noise type, as a whole, can be obtained. Furthermore, it is possible to lower the lower limit of the operating frequency by controlling the slip of the induction motor for driving the compressor and, thus, the comfortability is considerably improved.

What is claimed is:

1. An air conditioning apparatus, comprising:
    a scroll compressor for compressing a refrigerant to effect a refrigerating cycle;
    an induction motor for driving said scroll compressor; and
    an inverter for feeding an AC voltage of variable operating frequency to said induction motor, said inverter including a voltage pulse-width modulating circuit for pulse-width modulating the AC voltage by a carrier frequency higher than 10 KHz, and control means for detecting the slip of said induction motor and correcting the detected slip to a predetermined optimum value.

2. An air conditioning apparatus according to claim 1, wherein said control means includes means for correcting the slip when the operating frequency of said inverter is at or near a minimum operating frequency.

* * * * *